April 27, 1965  J. R. HUBER  3,180,623
STRAP TIE DOWN DEVICES
Filed Oct. 22, 1962
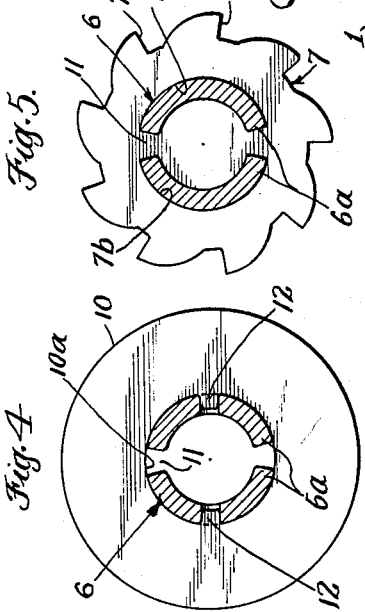
INVENTOR.
John Richard Huber
BY
Harris S. Campbell
ATTORNEY

3,180,623
STRAP TIE DOWN DEVICES
John Richard Huber, Holicong, Pa., assignor to Eastern Rotorcraft Corporation, Doylestown, Pa., a corporation of Pennsylvania
Filed Oct. 22, 1962, Ser. No. 231,932
2 Claims. (Cl. 254—164)

This invention relates to strap engaging and adjusting devices such as used for securing cargo and the like and is particularly concerned with improvements in the type of device which incorporates a ratchet mechanism for applying a tension load to the strap.

Devices of this nature usually include a frame which rotatably supports a drum structure to provide take-up movement for slack removal and tensioning by rotation of the drum structure. A ratchet wheel is attached to the drum structure and a holding dog or pawl is mounted on the frame. A handle is normally provided with another dog so that swinging movement of the handle will move the ratchet and drum in the tensioning direction. To release the rachet device and thus the strap tension, the handle may be swung to an extreme position which requires disengagement of the holding dog and the operating dog thereby permitting the drum to rotate in the unwinding direction.

In moving the handle to this extreme position there is a tendency for the frictional drag of the unwinding drum to cause rotation of the handle back into a dog engaging position with the result that the operator must hold the handle while the strap loosening operation is accomplished. It is an object of the present invention to provide a locking device which will hold the handle in the extreme released position so that it is unnecessary for the operator to hold the handle under these circumstances.

A more specific object of the invention is to provide an improved ratchet pawl mounting in the handle of the device to give a simpler mechanism and also one which is more easily operated for the load release functions. More specifically it is an object to provide a dog structure which at the outer end is moved in a direction substantially parallel to the handle while the actual tooth engaging portion of the dog is angled thereto and moves in a generally radial direction with respect to the toothed ratchet wheel.

A further specifiic object is the provision of a simple radial notch in the frame structure at a location to allow engagement by the handle mounted dog to accomplish the object set forth above in connection with retaining the handle at the extreme release position.

Another object is to provide an improved relationship of parts to allow increased angular travel of the handle during operational movements.

How the foregoing and other objects and advantages of the invention are accomplished will be clear from the following description of the drawing in which FIGURE 1 is an elevational view showing a strap tie down with the ratchet buckle device of the present invention.

FIGURE 2 is a view of the device shown in FIGURE 1 taken in the direction of arrows 2—2.

FIGURE 3 is an enlarged view of the adjusting mechanism somewhat similar to that shown in FIGURE 1 but with the handle moved to the extreme released position.

FIGURE 4 is a sectional view taken on the line 4—4, FIGURE 2.

FIGURE 5 is a sectional view along the line 5—5, FIGURE 2.

In the form of device shown a strap member 1 is supplied with a terminal connector such as hook element 2 and a strap engaging and adjusting device indicated by numeral 3. The device 3 incorporates a frame 4 having two spaced plate members 4a and 4b. The frame includes load transfer structure at one end in the form of an integral hook 5 which as shown may be made by bringing the two side plates together and shaping them to the proper contour.

At the end of the frame opposite hook 5 each frame plate 4a and 4b is provided with an aperture suitable for supporting the drum structure 6 which is composed of two similar portions 6a, 6a. Each portion 6a is in the form of a circular segment and when the two portions are positioned together form a cylindrical drum having a slot 11 along opposite sides of the cylinder. A pair of ratchet wheels 7 having teeth 7a are located with one wheel outside each of the frame plates 4a and 4b and these wheels 7 are provided with apertures 7b (see FIGURE 5) in the form of circular segments configured to fit the portions 6a, 6a of the drum member. A handle 8 is made with two side plates 8a and 8b which extend to the region of the drum 6 where each side plate incorporates a circular aperture to fit around the drum 6. A drive pin 9 extends through the segments 6a, 6a at each end and these prevent outward displacement of the frame plates 4a, 4b, ratchet wheels 7 and handle plates 8a, 8b. The inward displacement of these parts is prevented by means of washer plates 10 (see FIGURE 4). Plates 10 each have a generally circular aperture 10a with two inwardly directed projections 12 which fit into mating apertures in the drum segments 6a, 6a.

A holding ratchet pawl or dog 13 is supported in the frame plates 4a and 4b by means of a slot 14 in each plate. A spacer beam 15 extending between the frame plates 4a and 4b serves to retain the upper end of the pawl or dog 13. As will be clearly observed in FIGURE 2 the dog 13 is made with a transverse bridge portion 16 extending between the plates 4a, 4b and two end dog portions 17 which extend through the slots 14 and engage the teeth 7a of the ratchet wheel 7. A central guide extension 18 projects upwardly from the bridge portion 16 of the dog 13 through a suitable slot in the spacer beam 15. A compression spring 19 is supported in position by the extension 18 between the spacer beam 15 and the bridge portion 16 of the dog 13 thus providing for urging the dog 13 into engagement with the ratchet teeth 7a.

An actuating dog or pawl 20 is mounted in the handle side plates 8a and 8b, each of which is provided with a slot 21 to accommodate the dog structure 20. The handle 8 is made with a transverse plate 22 which connects the side plates 8a and 8b and retains them in proper relative position to each other. The dog 20 is made with a central plate portion 23 to which is attached the dog extensions 24. A central projecting guide 25 extends from the central plate portion 23 and is supported in an aperture in a flange 26 on handle plate 22. A compression spring 27 is mounted on the projection guide 25 and reacts between the dog 20 and the handle flange 26 to urge the dog 20 into engaged position with the ratchet teeth 7a. As will be noted the holding surface of each tooth 7a lies in a radial plane while the other surface of each tooth is inclined.

It will be noted that the handle side plates 8a and 8b are not symmetrical about a radial line extending from the center of the ratchet wheel 7. The slot 21 is located in the offset portion of the handle and is made in parallel relation to the handle in order to provide for adequate strength. The outer end of the dog part 24 therefore will move in a direction generally parallel to the handle. It is desirable however that the inner end of the dog should lie and move in a radial direction with respect to the wheel 7 to give effective holding and releasing action on the teeth 7a. Thus the inner end of the slot 21 is formed in a radial direction at a slight angle to the main portion of the slot. Likewise the inner end 24a of the dog portion 24 is bent into a radial plane. The mid-portion of the slot 21 is widened to give it a somewhat triangular shape to permit the inner end of the dog to move in a radial direction while the outer end of the dog moves in a direction parallel to the handle structure.

In using the strap device of the present invention the strap is inserted through the slot 11 of the drum 6. The ends of the strap device are anchored at suitable points by means of the hook 2 and the terminal hook 5 with the strap in position for retaining the article to be secured. The slack is pulled through the slot 11 by pulling on the free end of strap 1 and tightening action is initiated by swinging the handle 8 from its collapsed or closed position through the operating or tensioning range illustrated in dotted outline in FIGURE 1. When a single turn has been made on the drum 6 the strap 1 is held against slippage on the drum by virtue of the tension load in the loaded portion of the strap applying pressure to the unloaded end of the strap lying underneath it as it wraps on the drum. Back and forth movement of the handle within the tensioning range rotates the drum in the tensioning direction. As the handle is swung to the open position the handle dog 20 engages the ratchet teeth and moves them with the drum since the dog portion 24a is engaging the radial edge of the teeth 7a. During this motion the holding dog 13 in the frame 4 is being moved automatically by virtue of the inclined edge of the dog teeth 7a. At the end of the swinging stroke the holding dog 13 engages the radial edge of a ratchet tooth and holds it in this position while the handle is swung back to closed position. During the swing of the handle in this direction the handle dog functions automatically to ride over the teeth. The handle is oscillated back and forth in this manner until the desired tension in the strap is obtained.

This normal operational range of movement of the handle is limited because of the radial stop 28 which is formed in the frame 4 and against which the handle dog 20 engages to limit the extent of the swing. When it is desired to release the tension from the strap the handle dog 20 may be withdrawn from operating position by engaging the flanged portion 23a of the dog plate 23 and urging it outwardly out of engagement with the teeth 7a. The handle 8 may then swing beyond the position determined by the stop 28. In FIGURE 3 it will be noted that the handle side plates 8a and 8b are each provided with a circular portion 29 which extends around the drum for a distance sufficient to let the handle swing within the operating range without interfering with the action of the holding dog 13. However when the handle is swung beyond the position determined by stop 28 a cam portion 30 of each handle side plate engages the inner edge of the dog 13 and lifts it away from the tooth holding position. This permits the drum to become disengaged since it is no longer held by the ratchet wheel 7 and thus can unwind in a direction to release the tension in the strap 1.

In order to permit the operator to leave the handle in the extreme position for the release of the tension, which position is shown in full outline in FIGURE 3, a radial notch 31 with a backstop 32 is provided in each frame plate 4a, 4b to limit the extended position of handle motion and to permit the dog portion 24a to drop into the notch or slot 31 so that the handle will be retained in this position until released by the operator. With the handle in the full release position the drum 6 can be reversed to completely unwind the strap and pull it out to the desired length for further use.

It will be noted that the handle when in closed position lies in a somewhat tangential relationship to the drum 6. Also the strap 1 enters tangentially to the drum but at the opposite side to the closed handle position. This relationship, together with the compact radial moving handle dog 20, provides for increased angular movement of the handle as will be evident from the handle positions shown in FIGURES 1 and 3. It will be seen that handle movement in the opening direction induces take-up movement of the drum.

From the foregoing it will be evident that I have provided an improved mechanism and structure for ratchet type strap adjusting and tensioning devices. By the improved handle dog construction which permits an angular relationship for the movement of the inner end of the dog with respect to the outer end, simplified operation of the dog can be accomplished by a natural squeezing action between the outer end of the dog structure and the handle structure. Further, by the provision of the small radial notch at the full limit position of the handle, the handle dog may be used to retain the handle in the extreme position. The operator will then have both hands free to take care of operations in the releasing and adjusting of the strap and mechanism.

In addition more rapid adjustment is obtained by virtue of the improved angular travel of the handle.

I claim:
1. A strap engaging and adjusting device having
 (a) a frame incorporating two spaced plate members having load transfer structure located at one end,
 (b) a drum structure at the other end of said frame supported for rotational movement in said frame plate members and extending therethrough,
 (c) a handle having a pair of offset flat plate portions rotationally supported on said drum structure outside said frame plate members,
 (d) a pair of ratchet wheels, one of which is connected near each end of said drum structure for rotational movement therewith,
  (1) each of said ratchet wheels having a plurality of peripheral teeth, each tooth having one edge in a substantially radial plane and other edge having an inclined surface with respect to the radial direction,
 (e) a spring loaded ratchet dog movably supported on said frame in position to engage said ratchet teeth,
 (f) a second spring loaded ratchet dog slidably supported on said handle for engagement with said teeth thus providing for rotational movement of said drum structure by limited swinging movement of said handle,
 (g) said second ratchet dog having a portion extending in a direction approximately parallel to said handle and a shorter tooth engaging portion bent into a generally radial plane,
 (h) the flat plate portions of said handle each being provided with an elongated slot having
  (1) the inner part angled with respect to the outer part,
  (2) the outer part of said slot having a tapered width narrower at the outer end to allow the inner end of said handle mounted dog to be moved in a radial direction with respect to said wheels while the outer end of said dog is moved in a plane angled with respect to its inner end.
2. A strap engaging and adjusting device having
 (a) a frame incorporating two spaced plate members having load transfer structure located at one end,
 (b) a drum structure at the other end of said frame supported for rotational movement in said frame plate members and extending therethrough,
 (c) a handle having a pair of offset flat plate portions rotationally supported on said drum structure outside said frame plate members,
 (d) a pair of ratchet wheels, one of which is connected near each end of said drum structure for rotational movement therewith,

(1) each of said ratchet wheels having a plurality of peripheral teeth, each tooth having one edge in a substantially radial plane and the other edge having an inclined surface with respect to the radial direction, (e) a spring loaded ratchet dog movably supported on said frame in position to engage said ratchet teeth, (f) a second spring loaded ratchet dog slidably supported on said handle to move radially for engagement with said teeth thus providing for rotational movement of said drum structure by limited swinging movement of said handle, said ratchet wheel teeth and said second ratchet dog being positioned in relation to each other to provide take-up rotation of said drum when said handle is moved in an opening direction with respect to said frame, (g) said handle having means to engage said frame mounted ratchet dog when the handle is swung to a position beyond the limited swinging movement, (h) each of said frame plate members being shaped to lie below the radius of the teeth in the operating range and having a first radial projection in its edge extending to a point slightly beyond the radius of said teeth to form a stop against which said second ratchet dog engages to limit the normal swinging movement of said handle, (i) each frame plate member having a second radial projection in its edge extending beyond the radial dimension of said first radial projection, said second projection being located at a point past the limit of swinging determined by said first radial stop, (j) and each of said frame plate members having a notch at the second radial projection, the bottom of said notch being at a radial point sufficient to clear said ratchet teeth, (k) said second ratchet dog having a portion extending in a direction approximately parallel to said handle and a shorter tooth engaging portion bent into a generally radial plane, (l) the flat plate portions of said handle each being provided with an elongated slot having
 (1) the inner part angled with respect to the outer part,
 (2) the outer part of said slot having a tapered width narrower at the outer end to allow the inner end of said handle mounted dog to be moved in a radial direction with respect to said ratchet wheels while the outer end of said dog is moved in a plane angled with respect to its inner end.

References Cited by the Examiner
UNITED STATES PATENTS

| | | | |
|---|---|---|---|
| 1,001,547 | 8/11 | McMillen | 254—164 |
| 1,067,400 | 7/13 | Brooks | 254—164 |
| 1,287,313 | 12/18 | Hoffland | 254—164 |
| 2,874,431 | 2/59 | Elsner | 24—71.2 X |
| 2,993,680 | 7/61 | Davis | 254—164 |

SAMUEL F. COLEMAN, *Primary Examiner.*